Aug. 13, 1968    E. W. BOWEN ET AL    3,396,842
CONTAINER PRESSURE TESTING APPARATUS
Filed May 31, 1966    2 Sheets-Sheet 1
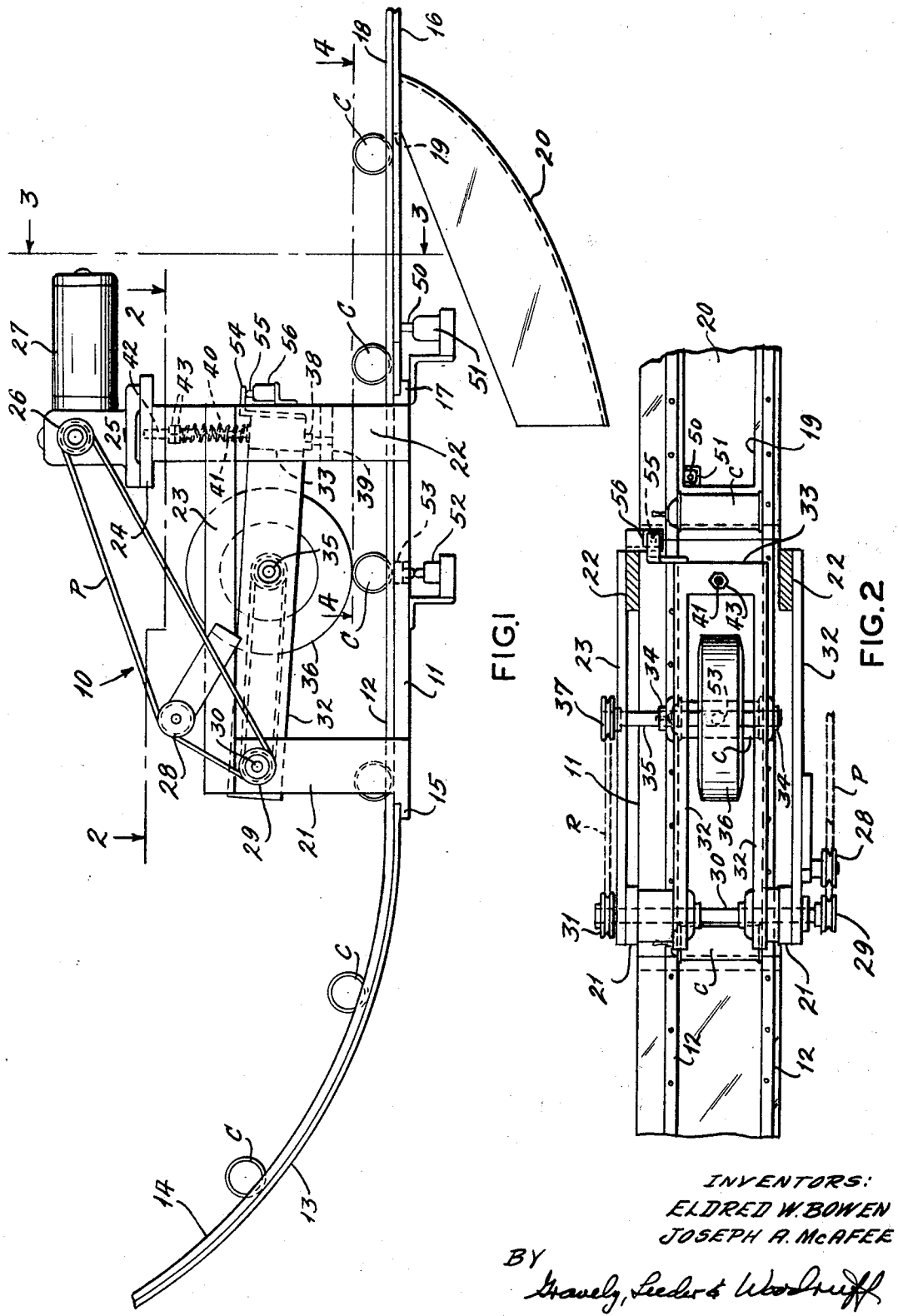
INVENTORS:
ELDRED W. BOWEN
JOSEPH A. McAFEE
BY
Gravely, Seeder & Woodruff
ATTORNEYS Aug. 13, 1968   E. W. BOWEN ETAL   3,396,842
CONTAINER PRESSURE TESTING APPARATUS
Filed May 31, 1966   2 Sheets-Sheet 2

INVENTORS:
ELDRED W. BOWEN
JOSEPH A. McAFEE
BY Gravely, Lieder & Woodruff
ATTORNEYS.

United States Patent Office 3,396,842
Patented Aug. 13, 1968

3,396,842
CONTAINER PRESSURE TESTING APPARATUS
Eldred W. Bowen, Brentwood, Mo., and Joseph A. McAfee, Bryan, Ohio, assignors to Pet Incorporated, a corporation of Delaware
Filed May 31, 1966, Ser. No. 553,759
7 Claims. (Cl. 209—73)

ABSTRACT OF THE DISCLOSURE

Apparatus for testing the sufficiency of pressurization of containers after the pressurizing operation to determine the correctness of the pressurizing operation and including means to effect rejection of "soft" containers while permitting containers having the minimum desired pressurization to pass through. The apparatus also includes means for conveying or guiding the containers in a rolling attitude and without appreciably interfering with the continuous movement of the rolling containers through the testing zone.

---

This invention relates to apparatus for testing the pressure in a dispensing container.

Pressurized dispensing containers present a problem in determining if the pressure of the propellant gas is excessive to pose a safety problem or if it is sufficient to effect substantially uniform delivery of the contents through the dispensing nozzle or other outlet. If the pressure within the container is not up to a predetermined minimum limit the contents also will not be fully dispensed. Testing for minimum pressure, therefore, cannot be accomplished by bleeding as that will result in loss of some pressure and if a container happens to be at or near the minimum pressure when tested in this manner the pressure bleed off in the testing apparatus will reduce the pressure below that required.

A further problem is that when testing through the nozzle the product leaks out and produces a messy condition around the nozzle which is highly objectionable, especially with food products. Only containers having an excess of pressure can be tested in this manner, but there is no certainty that all containers will be excessively pressurized. Moreover, it is not desirable to excessively pressurize all cans to provide bleed-off for testing purposes as there is a need to maintain a safety factor due to production variations in the dispensing nozzles and in the container construction. Over-pressurization is undesirable from the viewpoint of safety regulation violations, or of too explosive dispensing of the contents the first few times it is used, or because of non-uniform propelling of the contents.

It is therefore an important object of this invention to provide apparatus for testing pressurized containers to locate the containers that are pressurized improperly relative to a desired tolerance and for rejecting such containers, while passing other containers that fall within a predetermined pressure.

It is also an important object of this invention to provide apparatus for testing pressurized containers while moving in a conveyor system so as not to slow down the overall rate of production.

Another object of this invention is to provide simple and effective apparatus for determining whether a container is pressurized at least to a minimum pressure and to accomplish the testing while the containers are in movement.

A further object of this invention is to provide apparatus for testing pressurized containers without damage to the container and without loss in the pressurization thereof.

Still another object of this invention is to provide simple and positive operating apparatus that may be inserted in a high speed conveyor system for rapidly testing moving pressurized containers between production stations, such apparatus acting to effect rejection of containers that are below a predetermined pressure level.

A preferred form of apparatus comprises rotary pressure applying means for engaging each container on the fly in a conveyor system, signal means responsive to the rotary means for registering the action of the rotary means, and reject means responsive to the signal means for rejecting under-pressurized containers. The apparatus chosen for disclosure is intended to operate on a continuous cycle to avoid slowing down or stopping the movement of the containers. It is, therefore, especially suitable for high speed operation without causing damage to the appearance or structure of the containers, or without resulting in loss of pressure.

The invention resides in the assembly of parts and components, and equivalents thereof, hereinafter set forth and described in connection with the accompanying drawings, wherein:

FIG. 1 is a longitudinal elevational view of a pressurized container conveying system in which a preferred form of testing apparatus has been included;

FIG. 2 is a plan view of the testing apparatus as seen along line 2—2 in FIG. 1;

Figure 3:
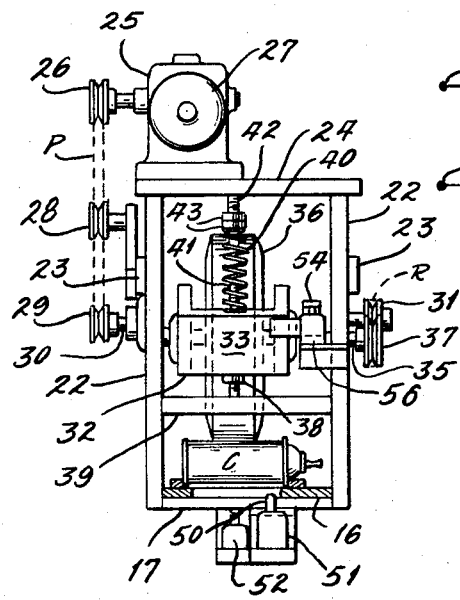
FIG. 3 is an end elevational view, partly in section, as seen along line 3—3 in FIG. 1.

In the following description of the apparatus shown in FIGS. 1, 2 and 3 no attempt will be made to detail the electrical and pneumatic systems, that being left for the schematic disclosure in connection with FIGS. 5 and 6 so as not to obscure the structure and components.

Referring to FIG. 1, it can be seen that the preferred testing apparatus 10, that is for either minimum or maximum pressure testing, includes a base structure 11 which may be a flat plate on which guide strips 12 are secured in parallel relation for the purpose of forming a track for the rolling passage of a series of pressurized containers C. The apparatus 10 is fed with the pressurized containers C by means of a suitable conveyor, in this case consisting of a flat plate 13 supporting spaced parallel guide strips 14. The plate 13 is secured to an overhanging lip 15 on the base 11 such that the guide strips 14 fall into alignment with the guides 12. The conveyor for feeding the containers C into the apparatus is inclined to a sufficient degree such that the containers, which may come from any suitable source, accelerate as they roll down the incline and gain sufficient momentum and spacing to pass through the testing apparatus 10 without substantial reduction in the speed of the rolling movement. The containers C, after being pressure tested, roll out on a discharge conveyor consisting of a flat plate 16 having one end secured to an overhanging lip 17 on the base 11 such that parallel guide strips 18 secured to the plate 16 form parallel continuations of the guide 12. The plate 16 includes a rejection zone, such as the aperture 19 in the plane of the plate for receiving containers which do not successfully pass the pressure test. The rejected containers are received from the rejection zone by a discharge chute 20 and pass on to a suitable collecting means not shown.

Still referring to FIG. 1, and with suitable reference to FIGS. 2 and 3, the testing apparatus mounted on the base 11 includes a frame structure having vertical posts 21 at the inlet end, and other vertical posts 22 at the outlet end. The posts 21 and 22 are connected by horizontal members 23 to complete the frame structure. The longer posts 22 at the outlet end extend above the horizontal members 23 and are cross-connected by a platform 24 which supports a suitable gear unit 25 having a power output pulley 26 thereon. The gear unit 25 is suitably connected to a drive motor 27. As may be seen in FIGS. 2 and 3, power pulley 26 is connected by a V-belt P over an idler pulley 28 to a pulley 29 which is fast on a shaft 30. While a V-belt is shown it is also intended that a sprocket and chain drive could be used, and in some cases would be preferred. The shaft 30 is bearinged in the posts 21 so that the pulley 29 is supported at one side of the frame, and a second pulley 31 is supported on the same shaft 30 at the opposite side of the frame. Between the vertical posts 21 there is a yoke-shaped frame consisting of parallel side members 32 having the free spaced ends pivotally mounted on the shaft 30. The opposite ends of the members 32 are rigidly cross-connected by a spacer 33. The side member 32 have bearings 34 which support a shaft 35 on which a rotary testing wheel 36 is fastened. The shaft 35 extends outwardly to a pulley 37 which is connected to the pulley 31 by a V-belt R.

It now appears that the yoke frame supporting the testing wheel 36 may pivot in a vertical plane about the axis of shaft 30 while the belt drive train from the power output pulley 26 to the pulley 37 can maintain constant driving relation in the manner shown. The rotary testing wheel 36 in its yoke frame is supported by an adjustable stop 38 mounted in a frame crossmember 39 such that the stop 38 may be threadedly or otherwise adjusted vertically to alter the spacing between the lower periphery of the testing wheel 36 and the plane of the base 11 between the guides 12. This spacing, as will appear, is selected to be substantially equal to the minimum diameter of the cylindrical body of the containers C. The testing wheel 36 and its yoke frame are constantly urged downwardly against the stop 38 by means of an adjustable compression spring 40 which has one end mounted over a guide post 41 in the cross-member 33 of the yoke, and its opposite end engaged over an upper guide 42 which is threadedly supported in the mounting platform 24 for the motor and gear unit. Adjustable nut means 43 on the guide 42 are provided in order to vary the amount of pressure exerted by the spring 40 on the crossmember 33. The spring 40 and adjustment nut 43 may be replaced by a pneumatic cylinder with pressure control to produce required load on wheel 36.

Figure 4:
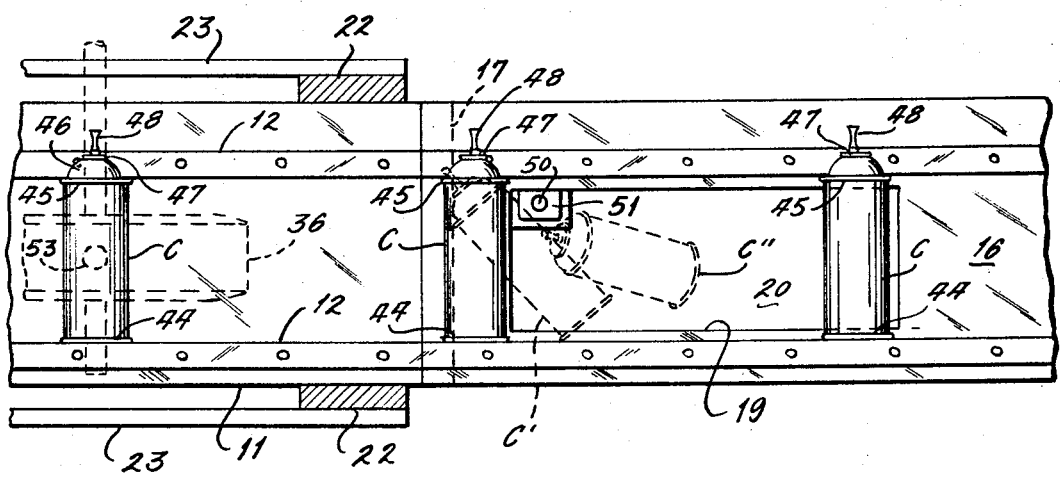
FIG. 4 is a greatly enlarged fragmentary plan view, partially in section, of the apparatus as seen along line 4—4 in FIG. 1.

As may be seen in FIG. 4, each container comprises a cylindrical body having chimes 44 and 45 respectively at the base and valve ends thereof. There is a cap structure 46 which supports a valve mechanism 47 having its dispensing nozzle 48 projecting therefrom. The guides 12 secured to the base 11 are offset with respect to a longitudinal center line in order to have the dispensing nozzle 48 clear all structure of the frame as the containers freely roll through the testing apparatus 10 toward the exit from the apparatus.

If a container C proves to be under-pressurized it will be manipulated by a stop pin 50 (FIG. 4) actuated by a pneumatic reject device 51. The manner of rejecting a container C is illustrated by the dotted line showing of container C' over the reject opening 19 of the plate 16. The container is stopped momentarily at the cover end 46 by the pin 50 while the base continues to roll and this throws the can in a direction longitudinally of the reject opening 19. The forward momentum of the rolling container C' will cause it to assume the angular position in dotted line at C''. Continued falling of the rejected container will carry it into the chute 20 with the cover end 46 usually uppermost. Once a rejected container C has reached the chute 20, it will slide, bottom end first, outwardly to a collecting point.

Referring now to FIGS. 1 and 3 it will be observed that directly below the testing wheel 36 and between the guides 12 there is disposed a switch element 52 having its feeler button 53 extending through the base 11 so as to have its outer end in a position to be depressed by each container C as it rolls through the testing apparatus 10. A very small amount of vertical displacement of the feeler 53 will effect closing of the switch 52. As each container C passes under the rotating testing wheel 36 it may or may not cause the yoke members 32 to pivot vertically about the shaft 30. This motion of the yoke members 32 is reflected in the vertical position of a yoke feeler arm 54 which is located over the button 55 of a switch 56 mounted on the frame as shown.

The setting of the feeler arm 54 and the switch button 55, when testing for minimum pressure, is such that the switch 56 is in a normally closed position which corresponds with the spring 40 retaining the yoke members 32 against the stop 38. When each container C passes the testing wheel 36, it will depress the feeler button 53 of switch 52. If the container is under-pressured or "soft," it will not cause movement of the feeler arm 54. On the other hand when a properly pressurized or "hard" container C passes the testing wheel 36 the reaction of the wheel 36 will be to cause the yoke members 32 to pivot upwardly thereby moving the feeler arm 54 and allowing the normally closed switch 56 to open.

On the other hand, when testing for excessive pressure, the apparatus is set with the switch 56 (FIG. 6) set normally open, and the pressure of spring 40 is increased to the desired upper limit. Thus, when a container is excessively pressurized the wheel 36 will be displaced to raise the yoke members 32 off stop 38 and close the switch 56 to activate reject means 51.

Figure 5:
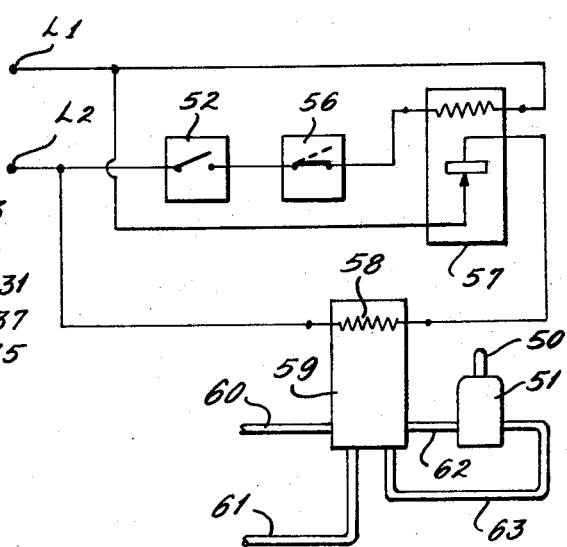
FIG. 5 is a diagrammatic disclosure of electrical and pneumatic means employed in the apparatus for testing for minimum pressure conditions.
Figure 6:
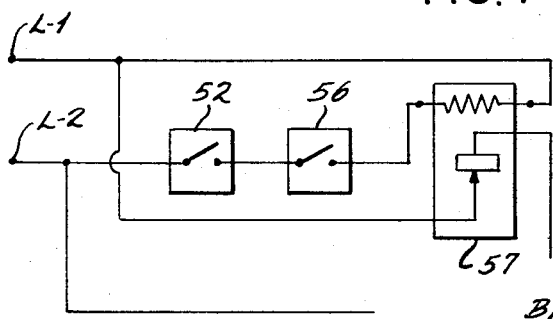
FIG. 6 is a fragmentary diagram of a modification of the means of FIG. 5 for testing for maximum pressure conditions.

Referring now to FIG. 5, it can be seen that the electrical connections for switches 52 and 56 are made from line contacts L1 and L2. The switches 52 and 56 are connected in series, and are also connected in series with a time delay device 57. The time delay device 57 energizes the solenoid coil 58 in a four-way solenoid valve 59. The valve 59 is supplied with air under pressure at conduit 60 and air is exhausted through conduit 61. The four-way valve 59 is connected to the reject device 51 by the conduits 62 and 63 respectively. The entire control system may be all electrical or all pneumatic, as desired.

From the foregoing description of FIGS. 1, 4 and 5 it can be appreciated that for production usages the containers freely roll under the power operated testing wheel 36 to successively actuate the switch 52 for closing the same. This action simultaneously takes place with the response of the yoke members 32 which moves or fails to move depending on the condition of pressure in the container. If the pressure is insufficient or "soft" the yoke members 32 will not raise and the switch 56 will remain normally closed. This completes an electric circuit (FIG. 5) through switches 52 and 56 to the time delay device 57 which at the proper moment will energize the solenoid 58 in the four-way solenoid valve 59 to admit air under pressure to the reject device 51 whose stop pin 50 will immediately be projected upwardly through the reject opening 19 to cause the desired container C' to be turned longitudinally so it may freely drop into the reject opening 19 (see FIG. 4). If a container is properly pressurized or "hard," the testing wheel 36 will be momentarily elevated and this will be reflected in the pivoting movement of the yoke members 32 to a sufficient extent to open the switch 56. This will immediately break the circuit to the time delay device 57, which will prevent the four-way solenoid valve being actuated and the reject device 51 will remain inactive so that the container will roll on over the reject opening 19 without being turned.

It can now be seen that each container C rolls in a horizontal position through the testing apparatus 10 where a portion of its side wall comes into rolling contact with a testing wheel 36. The peripheral speed of testing wheel 36 is substantially that of the peripheral speed of the rolling container side wall so that there is no damage to the side wall of the container. As the container passes under the testing wheel 36 the weight of the wheel and its supporting yoke members 32, together with the force of the spring 40, exerts a force on the side wall of the container. In the case of a properly pressurized "hard" container, the force of the testing wheel 36 will not be great enough to cause any deflection in the side wall, consequently, the testing wheel 36 is raised and the apparatus operates as described. When an under-pressurized "soft" container rolls past the testing wheel 36 its side wall will deflect slightly and to a sufficient degree such that the switch 56 will remain closed because the testing wheel 36 is not raised. The action taken by an under-pressurized container is described above in connection with FIGS. 4 and 5.

When testing for excessive pressurization a second apparatus is required in series with the apparatus 10. The second machine will be similar, but will have switch 56 set for normally open (FIG. 6) so that when excessively pressured containers pass wheel 36 the switch will close and actuate reject means 51. A series arrangement of apparatus 10 has not been shown as it can be well understood from this disclosure.

Because the containers C are rolling quite rapidly and are in a spaced condition, up to about six times the diameter of the cylindrical body, as they enter and leave the testing apparatus 10, the system must provide for suitable timing of the action of the reject device 51 so that only the "soft" under-pressurized, or over hard excessively pressurized container will be selected for rejection. The timing is effected through the relay device 57 whose timed sequence can be preset so that the stop pin 50 will not be projected upwardly through the opening 19 until the last container through the testing wheel 36 has had time to travel to approximately the beginnning of the reject opening 19.

The foregoing apparatus may now be clearly understood to operate for testing pressurized containers while the containers are on the fly in a conveyor runway. The testing wheel 36 preferably has its peripheral surfaces made of an elastomer of 87 to 90 durometer hardness for the purpose of avoiding scratching, denting or otherwise damaging the side walls of the containers. The wheel is sufficiently wide so as to reduce the unit force or squeeze applied to the side walls of the containers without preventing flexing of the wall for producing the test response desired.

In one apparatus of the above described preferred form, the containers fed along the conveyor 13 were caused to travel at a rate of approximately 240 feet per minute. The peripheral speed of the testing wheel 36 under this condition was approximately 328 feet per minute and was of a width such that the area of the can side wall that was contacted amounted to approximately 1.615 square inches for a container having a diameter of approximately 2⅝ inches and a length between chimes 44 and 45 of approximately 6 inches. The testing wheel 36 was loaded by the spring 40 such that it applied a force of approximately 116 lbs. to the side wall of the container, and this resulted in squeezing the can side wall to the extent of exerting approximately 71.9 p.s.i. on the contents.

The principle of operation of the testing apparatus is based on the fact that there is a definite relationship between the force necessary to slightly deflect the side wall and the internal pressure. This relationship has been found to be quite accurate and produces a reliable indication as to whether the pressure condition in a container is over or under a desired pressurization. All under-pressurized containers are immediately located and rejected by the apparatus, while correctly pressurized containers can pass on through. Where used in series, over-pressurized containers can also be located and rejected. No attempt is made to obtain a pressure reading of each container, but only to eliminate containers which are below or above a predetermined pressurization value. Of course, the pressurization for any given run of containers must be determined in advance so that the foregoing apparatus 10 can be set to handle such conditions. In the above described example, and with containers of approximately the size indicated, the testing apparatus 10 was found to handle approximately 135 cans per minute, at a spacing of approximately 5 to 6 diameters. Faster speeds, of course, can be obtained with proper setting of the apparatus as described and by utilizing equivalent means having faster response.

While the foregoing description has related to a presently preferred form of container pressure testing apparatus, it is understood that variations and equivalent means may be substituted for those described without departing from the scope of the appended claims.

What is claimed is:

1. Apparatus for testing pre-pressurized containers for internal pressure comprising a container guiding runway in the apparatus, conveyor means feeding containers to one end of said runway in rolling relation, discharge conveyor means extending from an opposite end of said runway to receive rolling containers and providing a reject zone therein, a normally inactive reject device spaced from said reject zone, a pair of switches in the apparatus connected in series relationship, movable container testing roller means in the apparatus over said runway and operably engageable with the container side wall, first means engaged with said testing roller means to adjust its spacing from said runway for substantially matching the diameter of the body of a container, a first one of said switches being normally closed and actuated to open position by movement of said testing roller means out of its adjusted spacing from said runway in response to a container rolling therethrough, second means adjacent said testing roller means to signal the arrival of a container at said testing roller means, a second one of said switches being normally open and actuated by said testing roller means to closed position, and coordinating means operably connected to said reject device and said pair of switches such that actuation of said second switch activates said reject device to reject the container causing said signal.

2. The apparatus of claim 1 wherein said movable testing means is a rotor having its peripheral surface engageable with a container to be tested, and means is provided to drive said rotor.

3. The apparatus of claim 1 wherein said coordinating means has a time delay element which determines the time of activation of said reject device.

4. Apparatus for testing sufficiency of the internal pressure of containers of cylindrical configuration about a longitudinal axis: the apparatus including a runway to support and guide containers in a free rolling attitude with the longitudinal axis as a center, said runway having an initial inclined portion to increase the rolling momentum of containers; container pressure testing means cooperating with said runway including a container pressure testing roller rotatable about an axis substantially parallel with the rolling axis of the containers, means supporting said testing roller for swinging movement toward and away from the runway, means adjustably limiting the movement of said testing roller toward said runway to substantially match the minimum desired diameter of the containers to be tested, and means to adjust the effective position of said testing roller to yieldingly respond to the container diametrical size as a function of the internal pressure desired in the containers; reject means spaced from said testing roller in the path of rolling movement of the containers including operable means to turn the rolling containers out of the rolling position and chute means to receive rejected containers turned by said turning means; and control means operably responsive to said testing roller and connected to said container turning means selectively to operate said turning means in response to substantially no swinging movement of said testing roller upon a container reaching the position of the testing roller to orient the container for discharge, and to prevent operation of said turning means in response to swinging movement of said testing roller upon a container with desired pressure displacing said roller.

5. The apparatus of claim 4 wherein said control means includes a first element responsive to the presence of each container adjacent said testing roller, a second element responsive to containers having a minimum desired internal pressure, and means operably interconnecting said first and second elements with said reject means.

6. The apparatus of claim 5 wherein said first and second elements are electrical switches interconnected in series, and said reject means is a pin element movable upon closing of said switches to intercept a container off-center and turn the same off said runway.

7. The apparatus of claim 5 wherein said first element is a normally open switch and said second element is a normally closed switch, and said reject means is an element extendable into the path of rolling containers upon closing of said open switch and prevented from extending into such path by opening of said closed switch.

References Cited

UNITED STATES PATENTS

| | | | |
|---|---|---|---|
| 2,011,332 | 8/1935 | Chapman | 209—79 X |
| 2,542,090 | 2/1951 | Lorenz | 209—73 X |
| 2,648,977 | 8/1953 | Mills | 73—52 |
| 3,089,593 | 5/1963 | Honnert | 73—52 X |
| 3,195,724 | 7/1965 | Whitacre | 209—88 |

ALLEN N. KNOWLES, *Primary Examiner.*